Feb. 12, 1963 L. A. KILLE ET AL 3,077,152
CAMERA CONSTRUCTION
Filed Sept. 8, 1960 2 Sheets-Sheet 1
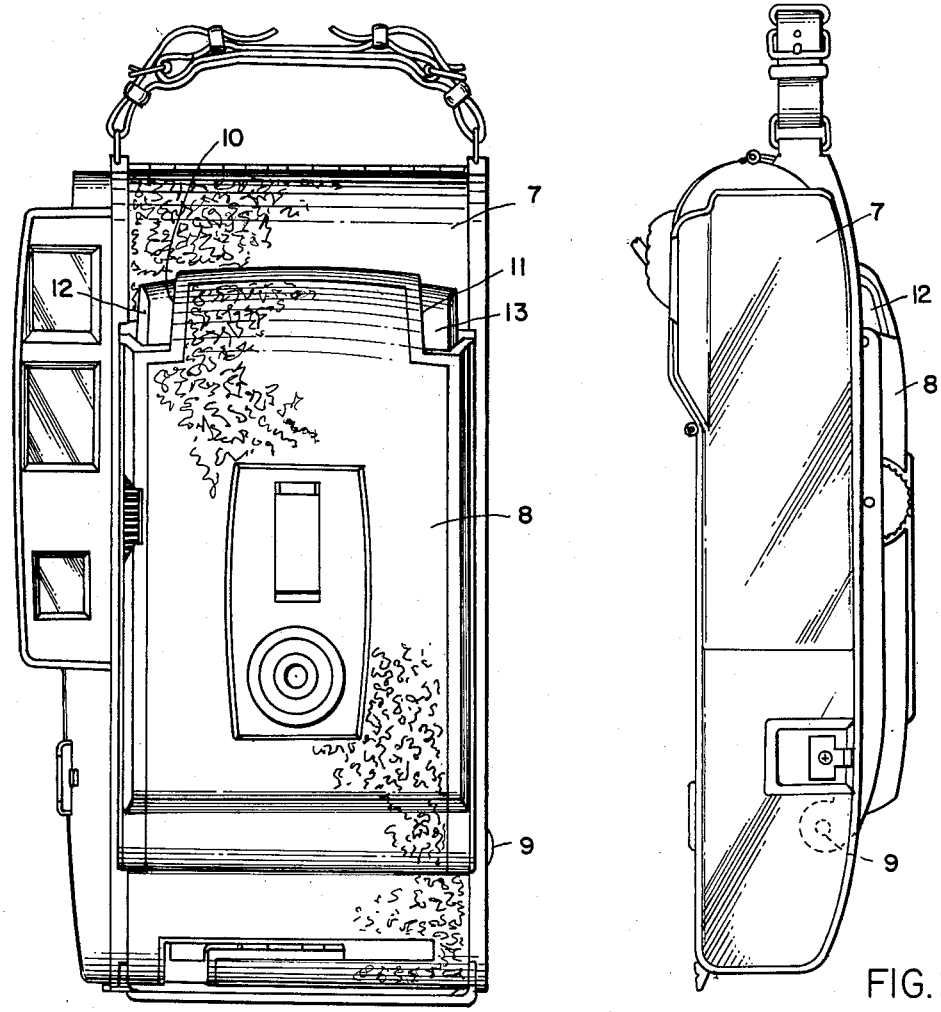
FIG. 1
FIG. 2
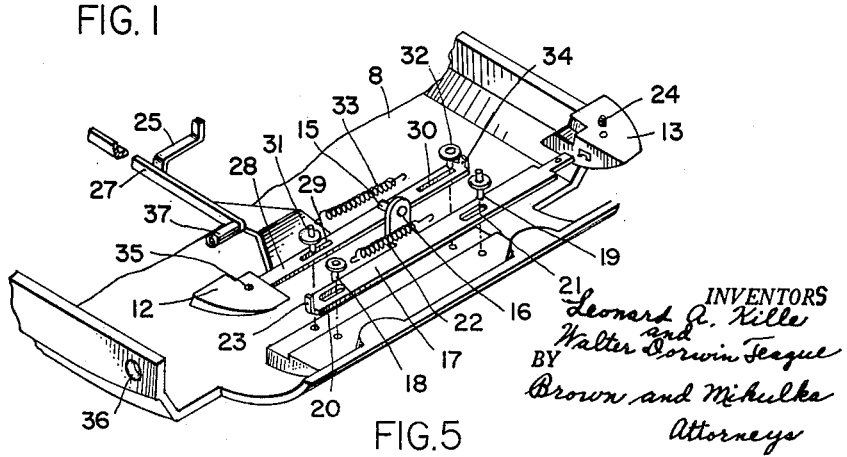
FIG. 5
INVENTORS
Leonard A. Kille
Walter Dorwin Teague
BY Brown and Mikulka
Attorneys Feb. 12, 1963   L. A. KILLE ET AL   3,077,152
CAMERA CONSTRUCTION
Filed Sept. 8, 1960   2 Sheets-Sheet 2

INVENTORS
Leonard A. Kille
and
Walter Dorwin Teague
BY
Brown and Mikulka
Attorneys

United States Patent Office 3,077,152
Patented Feb. 12, 1963

3,077,152
CAMERA CONSTRUCTION
Leonard A. Kille, Stoneham, Mass., and Walter Dorwin Teague, Annandale, N.J., assignors to Polaroid Corporation, Cambridge, Mass., a corporation of Delaware
Filed Sept. 8, 1960, Ser. No. 54,769
5 Claims. (Cl. 95—40)

This invention relates to photography, and more specifically to the construction of folding cameras of the hinged base type. In such cameras, the base, or camera bed, is hinged to a camera body and is movable between open and closed positions with respect to said body. Such cameras are normally provided with means for holding them in the folded or closed position and with some method of releasing this means, such as a lever or button for releasing a latch. Also, such cameras usually contain a shutter mechanism for controlling the exposure of the film and are provided with means, such as a button or lever, for operating or initiating the movement of the shutter.

It is an object of this invention to provide means for accomplishing these two functions, i.e., releasing the means holding the camera in the folded position and operating the shutter, which permit a more compact construction of the camera.

A further object is to provide means for accomplishing the aforementioned functions which add to the attractive and efficient design of the camera in addition to fulfilling their respective functional purposes.

Another object is to provide means for operating the shutter which allows more comfortable and steadier holding of the camera while making the exposure.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a front view of a camera embodying the subject invention, shown in the closed position;

FIG. 2 is a side view of the camera shown in FIG. 1;

FIG. 5 is an exploded, perspective view of the front portion of the camera bed which forms part of the camera shown in FIG. 1.

Figure 4:
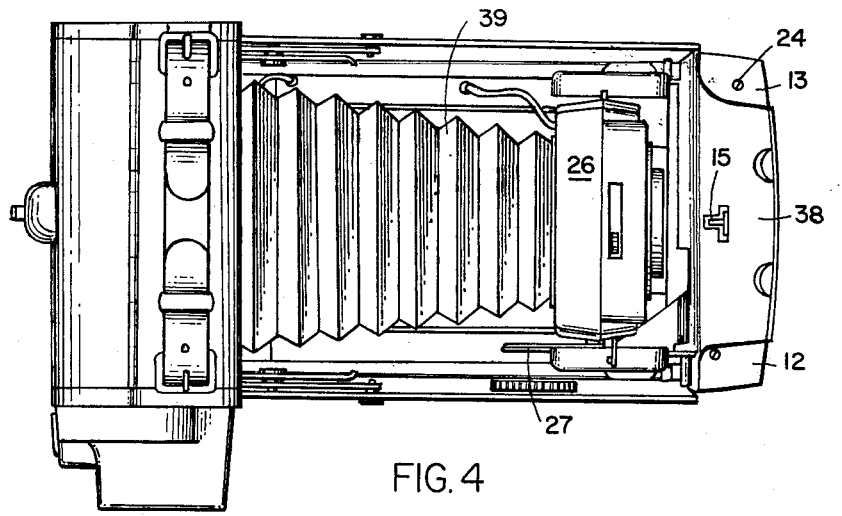
FIG. 4 is a top view of the camera shown in FIG. 1, in the fully open position.

Referring now to the drawings, the invention is shown as embodied in a camera which comprises a camera body 7 having a camera bed 8 hinged thereto at 9 in any convenient manner. In the form illustrated in the drawings, the invention is shown as a part of the well-known Polaroid Land camera, as exemplified in U.S. Patent 2,455,111, but is not intended to be restricted solely to cameras of this type. The camera bed 8 has its peripheral edges formed in a predetermined outline, which is shown in FIG. 1 as being essentially rectangular in form in the front view, with symmetrically arranged portions thereof cut away at corners 10 and 11. Buttons 12 and 13 are mounted, by means described later, in these cutaway corners 10 and 11 in such a manner that the outline of the buttons 12 and 13, in combination with that of the camera bed 8, is essentially rectangular. Thus, buttons 12 and 13 form a part of the design outlines of the camera bed, still being efficiently positioned to perform their respective functional purposes.

Figure 3:
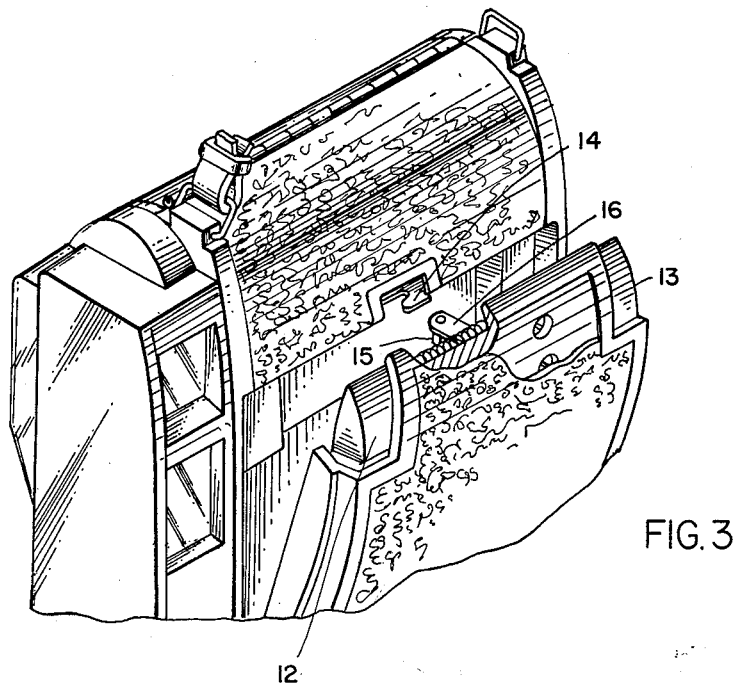
FIG. 3 is a partial perspective view, partly in section, of the upper portion of the camera shown in FIG. 1, with the camera bed in partly open position.

As is best seen in FIGS. 3, 4, and 5, when in the closed position, the bed 8 is held securely in contact with the body 7 by means of a stationary hook 14 on the body 7 being engaged by a pin 15. The pin 15 is mounted on a flanged portion 16 of the latch slide 17. Pins 18 and 19 are fixedly mounted in the camera bed 8 and pass through slots 20 and 21 in the latch slide 17. A return spring 22 is mounted by passing one of its ends around fixed pin 19 and the other through a hole 23 in one end of the movable latch slide 17. Button 13 is mounted on the other end of latch slide 17 by means of a screw 24 which holds the two together. Thus the latch slide 17 is laterally movable with respect to the camera body 7 and bed 8, by application of force to button 13, its movement being limited by fixed pins 18 and 19 and slots 20 and 21. This movement puts spring 22 in tension and the spring pressure returns latch slide 17 to its original position when the force on button 13 is removed.

A lens and shutter housing 26 is connected to an opening in the camera body 7 by means of extensible bellows 39. When the camera is in the closed position, as in FIGURES 1 and 2, bellows 39 and lens and shutter housing 26 are retracted within camera body 7. When the camera is in the open position, bellows 39 and lens and shutter housing 26 may be extended from camera body 7 and erected on camera bed 8, as shown in FIG. 4. The erection of lens and shutter housing 26 may be accomplished by any conventional means well known to those skilled in the art.

An actuator, such as lever 25, shown in part in FIG. 5, lateral movement of which causes the operation of a shutter mechanism (not shown), extends downward from lens and shutter housing 26. Lever 25 is movable by means of an arm 27 which extends from the front of the camera bed 8 toward the camera body 7 when the camera is in the open position. Arm 27 is of sufficient length to make contact with lever 25 when the lens and shutter housing 26 is in any focus position on the camera bed 8. The arm 27 extends perpendicularly from, and is a part of, the shutter release slide 28. As is the latch slide 17, the shutter release slide 28 is mounted, through slots 29 and 30, on pins 31 and 32 fixedly mounted on the camera bed 8. A shutter release slide return spring 33 is provided, being mounted, as is the latch slide return spring 22, with one end around fixed pin 31 and the other end through a hole 34 in one end of the movable shutter release slide 28. On the other end of the shutter release slide 28, button 12 is attached by means of screw 35. Thus the shutter release slide 28 is laterally movable with respect to the camera bed 8 by the application of force to button 12 which puts return spring 33 in tension. The spring pressure returns the shutter release slide 28 to its original position when the force is removed, the movement being limited by fixed pins 31 and 32 and guide slots 29 and 30. A threaded hole 36 is provided in the side of the camera bed 8 to receive a plunger, of the ordinary fabric-covered wire or other suitable type, if operation of the shutter by that means is desired. The movable portion of the plunger would strike against pin 37 on the shutter release slide 28, moving the slide 28 and arm 27 thus operating the shutter mechanism, through lever 25.

Figure 6:
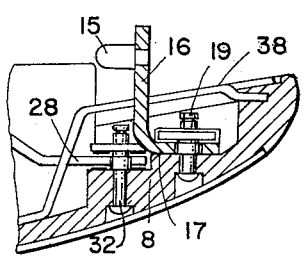
FIG. 6 is a side view, in section, of the portion of the camera bed shown in FIG. 5.

As shown in FIGS. 2, 3 and 6, the camera bed 8 is curved along the edge where the fixed pins 18, 19, 31 and 32, the latch slide 17 and the shutter release slide 28 are mounted. To this curved portion is attached a cover 38 which, together with the camera bed 8, forms a hollow enclosure for the slides 17 and 28, springs 22 and 33, and pins 18, 19, 31 and 32. Buttons 12 and 13, which are mounted to extend outside this enclosure in cutaway corners 10 and 11, are curved along the surface adjacent to the curved surface of the camera bed 8. Thus, the design outline of buttons 12 and 13 is the same as that of the camera bed 8 in all views.

The normal method of supporting the camera while making an exposure is to place one hand on the camera body and the other hand under the bed. If the means for operating the shutter is mounted on the shutter and lens housing, or in some other position above the camera bed, as is the usual case, it is of course necessary that a portion of the hand supporting the camera bed be free to perform this operation. The incorporation in the camera bed of the member to which force is applied to cause the operation of the shutter allows the operator to apply this force equally well with either the left or right hand while grapsing the camera bed in essentially the entire hand, thus giving more support and allowing steadier holding while making the exposure.

By cutting away one corner of the camera bed 8, shutter release button 12 is advantageously placed in the camera bed, and with the other corner cut away to accommodate the latch release button 13, it is apparent that the two buttons, in combination with the camera bed, result in significant advantages in ease of handling and compactness of camera construction, as well as adding materially to an attractive design for the camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A folding camera comprising a camera body, a camera bed hingedly connected thereto and movable between open and closed positions, exposure control means comprising a shutter including an actuator for operation thereof, first and second movable members each having one or more openings therein through which pass one or more pins, said pins being fixedly mounted on a common portion of said camera bed, movement of said members being limited by said openings and said pins, said first member including means releasably engageable with a portion of said camera body to hold said camera bed in said closed position, a first button fixedly attached to one end of said first member, said second member including means movably engageable with said actuator to cause operation of said shutter, a second button fixedly attached to one end of said second member, said first and second members being movable by application of force to said first and second buttons respectively, said camera bed having its peripheral edge formed in a predetermined outline, and said first and second buttons being mounted in symmetrically arranged cutaway portions of said peripheral edge in such a manner that the outline of said first and second buttons substantially completes said predetermined outline in said cutaway portions.

2. A folding camera as set forth in claim 1 wherein spring bias is provided for said first and second members.

3. A folding camera as set forth in claim 2 wherein said bias is provided for said first and second members respectively by first and second springs, each of said springs being attached at one end to one of said pins and at the other end to one of said members.

4. A folding camera as set forth in claim 3 wherein said predetermined outline is substantially rectangular and said cutaway portions comprise two corners of said bed remote from the hinged connection of said bed to said body.

5. A folding camera as set forth in claim 4 wherein said first and second springs, said fixed pins and at least a portion of said first and second members are contained within an enclosure formed by a curved forward edge of said camera bed between said two corners and a cover which is attached to said curved edge.

References Cited in the file of this patent

FOREIGN PATENTS

| 657,315 | Germany | Mar. 2, 1938 |
| 105,185 | Australia | Sept. 29, 1938 |
| 490,614 | Canada | Feb. 17, 1953 |